United States Patent
Chien et al.

(10) Patent No.: US 6,717,656 B2
(45) Date of Patent: Apr. 6, 2004

(54) METHOD AND APPARATUS OF A LASER RANGE DETECTOR

(75) Inventors: Pie-Yau Chien, Taichung (TW); Chia-Jung Wu, Taichung (TW)

(73) Assignee: Asian Optical Co. Ltd., Taichung (TW)

( * ) Notice: Subject to any disclaimer, the term of this patent is extended or adjusted under 35 U.S.C. 154(b) by 0 days.

(21) Appl. No.: 10/112,276

(22) Filed: Mar. 28, 2002

(65) Prior Publication Data

US 2002/0126270 A1 Sep. 12, 2002

Related U.S. Application Data

(63) Continuation-in-part of application No. 09/487,623, filed on Jan. 20, 2000, now abandoned.

(51) Int. Cl.[7] .................................................. G01C 3/08
(52) U.S. Cl. ..................................... 356/5.01; 356/5.08
(58) Field of Search ................................ 356/5.01, 5.08

(56) References Cited

U.S. PATENT DOCUMENTS

| | | | | |
|---|---|---|---|---|
| 3,853,402 A | * | 12/1974 | Nichols | |
| 3,900,261 A | * | 8/1975 | Wingate | |
| 4,569,599 A | * | 2/1986 | Bolkow et al. | |
| 5,054,911 A | * | 10/1991 | Ohishi et al. | |
| 5,262,837 A | * | 11/1993 | Shyy | |
| 5,852,491 A | * | 12/1998 | Kato | 356/5.01 |
| 6,133,992 A | * | 10/2000 | Tanaka et al. | 356/5.07 |
| 6,229,598 B1 | * | 5/2001 | Yoshida | 356/5.01 |

* cited by examiner

*Primary Examiner*—Stephen C. Buczinski
(74) *Attorney, Agent, or Firm*—Thomas, Kayden, Horstemeyer & Risley

(57) ABSTRACT

The present invention is a method and an apparatus of a laser range detector, a delay circuit is comprised for generating a plurality of delay signals. With the delay signal, the precision of detecting could be improved without faster clock signals or higher power consumption.

4 Claims, 4 Drawing Sheets

METHOD AND APPARATUS OF A LASER RANGE DETECTOR

CROSS REFERENCE TO RELATED APPLICATION

This application is a continuation-in-part of U.S. patent application Ser. No. 09/487,623 filed Jan. 20, 2000, now abandoned which is hereby incorporated by reference.

BACKGROUND OF THE INVENTION

1. Field of the Invention

The present invention relates to a laser range detector and more particularly pertains to a method and apparatus for a laser range detector to detect a distance precisely.

2. Description of the Related Art

It is convenient to use a laser beam to detect the distance from a laser range detector to a target point.

FIG. 1 of the drawings illustrates a structure of a laser range detector in the prior art. A MPU 130 outputs a trigger signal to a clock unit 120, the clock unit 120 receives the trigger signal and outputs an emitting signal to an emitter 110 and outputs a clock signal to a sampler 160. The emitter 110 receives the emitting signal and outputs a pulse S0 to a target point and a receiver 150 receives a pulse S1 reflected from the target point, the features of the pulse S1, for example, the waveform or the period are similar to the pulse S0. The receiver 150 outputs the pulse S1 to the sampler 160. The sampler 160 samples the pulse S1 according to the clock signal and outputs pulse clock data corresponding to the pulse S1 to a register 170. The register 170 stores the pulse clock data. The MPU 130 receives the pulse clock data from the register 170 and calculates the time between the pulse S0 and S1, then calculates the distance to a target point.

A problem with the laser range detector is the precision of the detection. As illustrated in FIG. 2, a pulse S0 is output by a laser range detector, a pulse S1 and a pulse S2 are reflected by the target and are received by a laser range detector, wherein the pulse S1 and S2 are sampled at the same clock so the distances calculated are the same (both at $122_{th}$ clock). In fact, the distances are different because the pulse S11 and S21 are not the same. A faster clock generator can improve the precision of the detection because a pulse can be sampled more times. But a faster clock generator is expensive and a circuit working at a faster clock is complicated.

SUMMARY OF THE INVENTION

In view of the foregoing disadvantage inherent in the laser range detector in the prior art, it is one object of the present invention to provide a method and an apparatus to detect a distance precisely for a laser range detector.

To attain the object, the present invention provides a method for a laser range detector to detect a distance precisely. The method including the following steps: first, emitting a first signal to a target; second, receiving a second signal which is the first signal reflected by the target; then generating one or more delay signals; then generating a plurality of pulse clock data from sampling the second signal or the delay signals; then calculating a precise time according to the pulse clock data; and calculating a precise distance according to the precise time, wherein each delay signal is delayed for a multiple default time from the second signal and the period of the second signal is smaller than the default time.

To attain the object, the present invention provides an apparatus for a laser range detector to generate a plurality of delay signals, the apparatus including: an input terminal for inputting a second signal; and one or more delay units for generating one or more delay signals; and a switching circuit for selectively outputting one of the second signals or the delay signals; wherein the feature of the delay signal is similar to the second signal.

To attain the object, the present invention provides an apparatus for a laser range detector to detect a distance precisely, the apparatus including: a processor for calculating a precise time and a precise distance; and a clock generator for outputting clock signals; and an emitter for emitting a first signal to a target; and a receiver for receiving a second signal collided from a target; and a delay circuit for passing the second signal and outputting one or more delay signals; and a sampler for sampling the second signal or the delay signals; and a register for storing a plurality of pulse clock data corresponding to the second signal or the delay signals; wherein the feature of the second signal and the delay signals are similar to the first signal.

BRIEF DESCRIPTION OF THE DRAWINGS

The present invention can be more fully understood by reading the subsequent detailed description in conjunction with the examples and references made to the accompanying drawings, wherein.

Similar reference characters denote corresponding features consistently throughout the attached drawings.

DETAILED DESCRIPTION OF THE PREFERRED EMBODIMENT

Figure 3:
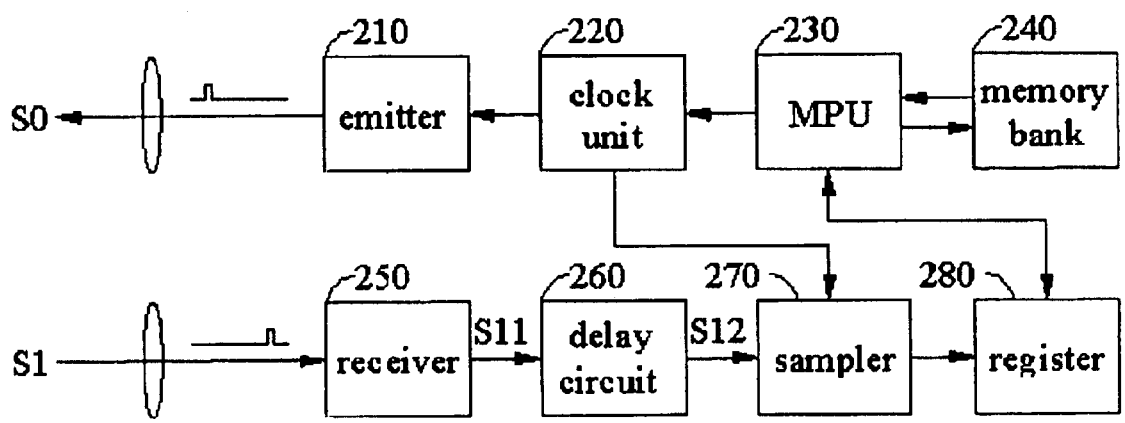
FIG. 3 illustrates a block diagram of a preferred embodiment of the invention.

With reference now to the drawings, FIG. 3 illustrates a block diagram of a preferred embodiment of the invention. A MPU 230 outputs a trigger signal to a clock unit 220. The clock unit 220 receives the trigger signal and outputs an emitting signal to an emitter 210 and outputs a clock signal to a sampler 270. The emitter 210 receives the emitting signal and outputs a pulse S0 to a target and a receiver 250 receives a pulse S1 reflected by the target, the feature of the pulse S1, for example, the waveform or the period, are similar to the pulse S0. Then, the receiver 250 outputs a pulse S11 to a delay circuit 260. The delay circuit 260 receives the pulse S11 and generates one or more delayed pulses, such as a pulse S12. Wherein the pulse S12 is delayed for a default time from the pulse S11 and the period of the clock signal is smaller than the default time. The delay circuit 260 outputs the pulse S11 and the pulse S12 to the sampler 270. The sampler 270 samples the pulse S11 and S12 according to the clock signal and outputs a plurality of pulse clock data corresponding to the pulse S11 and S12 to a register 280, the register 280 stores the pulse clock data. The MPU 230 reads the pulse data from the register 280 and calculates the time between the pulse S0, S11 and S12 then calculates the distance to a target point precisely.

Figure 1:
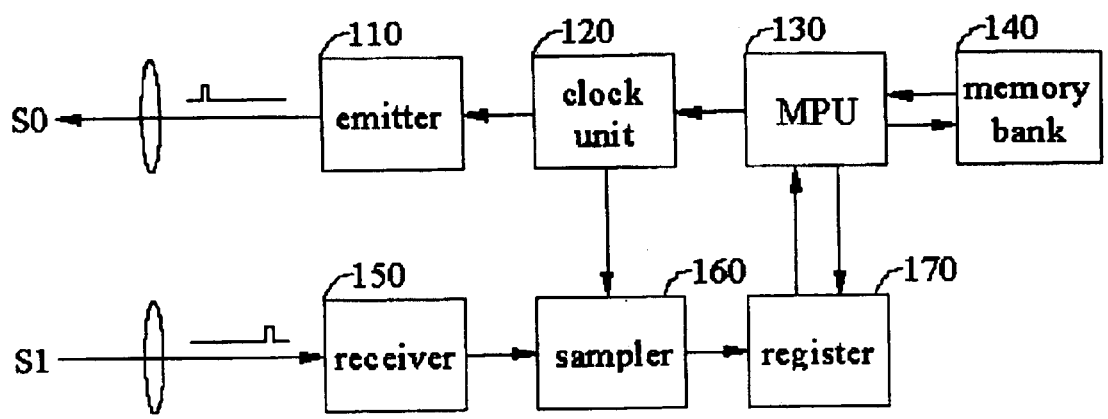
FIG. 1 illustrates a block diagram of a laser range detector in the prior art.
Figure 2:
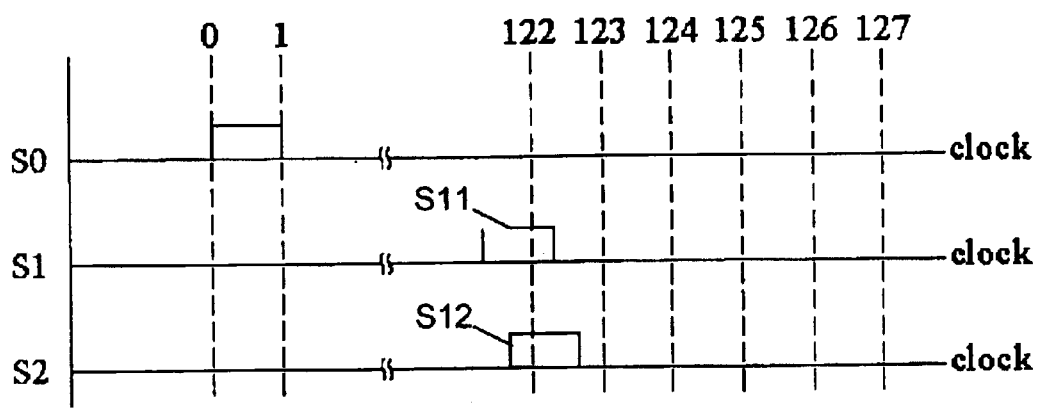
FIG. 2 illustrates a timing diagram of pulse signals.
Figure 4:
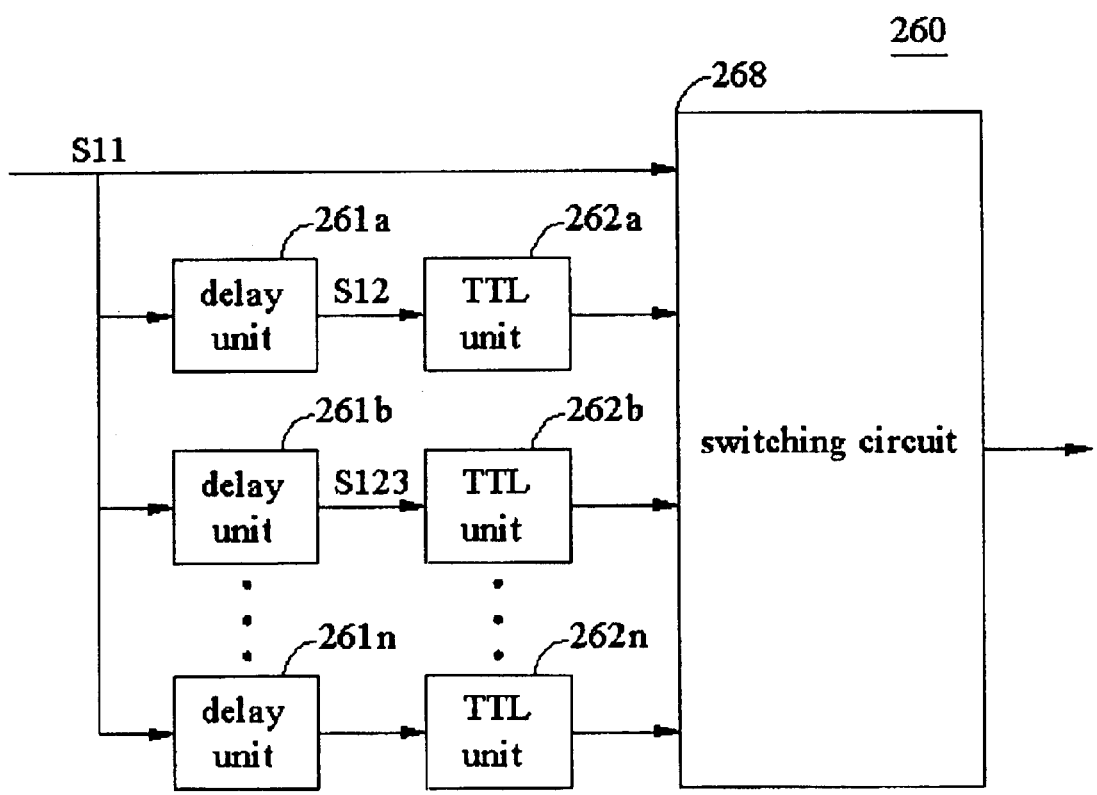
FIG. 4 illustrates a block diagram of a preferred embodiment of a delay circuit of the invention.

FIG. 4 illustrates a block diagram of a preferred embodiment of a delay circuit of the invention. The delay circuit 260 includes a plurality of delay units and a plurality of TTL units, wherein one TTL unit corresponds to one delay unit. One delay unit 261a and one TTL unit 262a are illustrated in the delay circuit 260. However, it is understood that any number of delay units and TTL Units can be used. In this embodiment, the pulse S11 is input to the delay circuit 260. The delay unit 262a outputs a pulse S12 according to the pulse S11 to a TTL unit 262a, the TTL unit 262a alters the waveform of the pulse S12 and outputs a square wave of the pulse S12 to a switching circuit 268. Each delay unit delays the pulse S11 for a multiple of a default time, for example, the pulse S12 is delayed from the pulse S11 for a default time as shown as in FIG. 2. It is understood that if the delay circuit 260 further comprises a delay unit 261b and a TTL unit 262b, a pulse S13 generated from the delay unit 261b delays the pulse S11 for twice the default time. A third delay unit would delay the pulse S11 for three times the default time and so on. The switching circuit 268 passes the pulse S11 or S12, wherein the switching circuit 268 is a N to 1 or gate.

The default time can be selected according to the delay unit and the TTL unit within the delay circuit. For the default delay time setting, we choose accuracy number (R) according to the desired accuracy and delay circuit unit performance from the following formula:

$$t_k = (Q*d) - \frac{M_k * d}{R}$$

where $t_k$ is the kth delay time, $M_k$=k and R are the accuracy number, k is the natural number from 0 to R-1, d is the operated clock period and set as $12.192*10^{-9}$ seconds, and Q is the delay number (Q>R).

For example, for achieving the d/2 accuracy, the accuracy number R is 2 and the other parameters are: K=0, 1; Q=3; $t_0$=3d; $t_1$=3d−d/2. If k=1, Q=3, $M_k$=1 and R=2 then $t_1$=3*d−[(1*d)/2]=2.5d. If k=2 then $t_2$=5d and so on. Therefore, the pulse S12 delays the pulse S11 for 2.5 clock periods and the pulse S13 delays the pulse S11 for 5 clock periods and so on. It is understood that the default time is larger than one clock period so the second signal and each delay signal corresponding to the second signal can be sampled particularly.

On the basis of the time difference between the pulse S11 and S12, the pulse S11 is sampled at the $122_{th}$ clock and the pulse S12 is sampled at the $124_{th}$ clock. In the preferred embodiment a precise time can be calculated with the pulse S11 and the pulse S12 and S13 and so on. An indefinite time can be calculated with the tine between the pulse S0 and the pulse S11, then the indefinite time can be corrected with the time between the pulse S0 and the pulse S11 and the pulse S12 and so on. For example, a precise time Tprecise is calculated with the following equation:

$$Tprecise = T_o + \frac{\sum_{k=1}^{R-1}(t_k - T_o) \times k - Q \times d}{R}.$$

wherein the T0 is the time between the emitted pulse and the pulse received from the receiver and the time $T_k$ is between the emitted pulse and the $k_{th}$ delay pulse. For example, T0 is the time between pulse S0 and the pulse S11, e.g. T0 is 122*d=1.4874E-6 seconds. T1 is the time between pulse S0 and the pulse S12, e.g. T1 is 124*d=1.5118E-6 seconds. Therefore, the Tprecise=1.4996E−6−1.5d=1.481E-6.

A distance can be calculated by a time. A precise distance Xprecise is calculated by the following equation:

$$Xprecise = \frac{Tprecise * 3.28E8}{2}$$

wherein 3.28*E8 is the speed of light in meters. Therefore, the precise distance Xprecise is 1.481E-6*3.28E8/2=243 meter.

Figure 5:
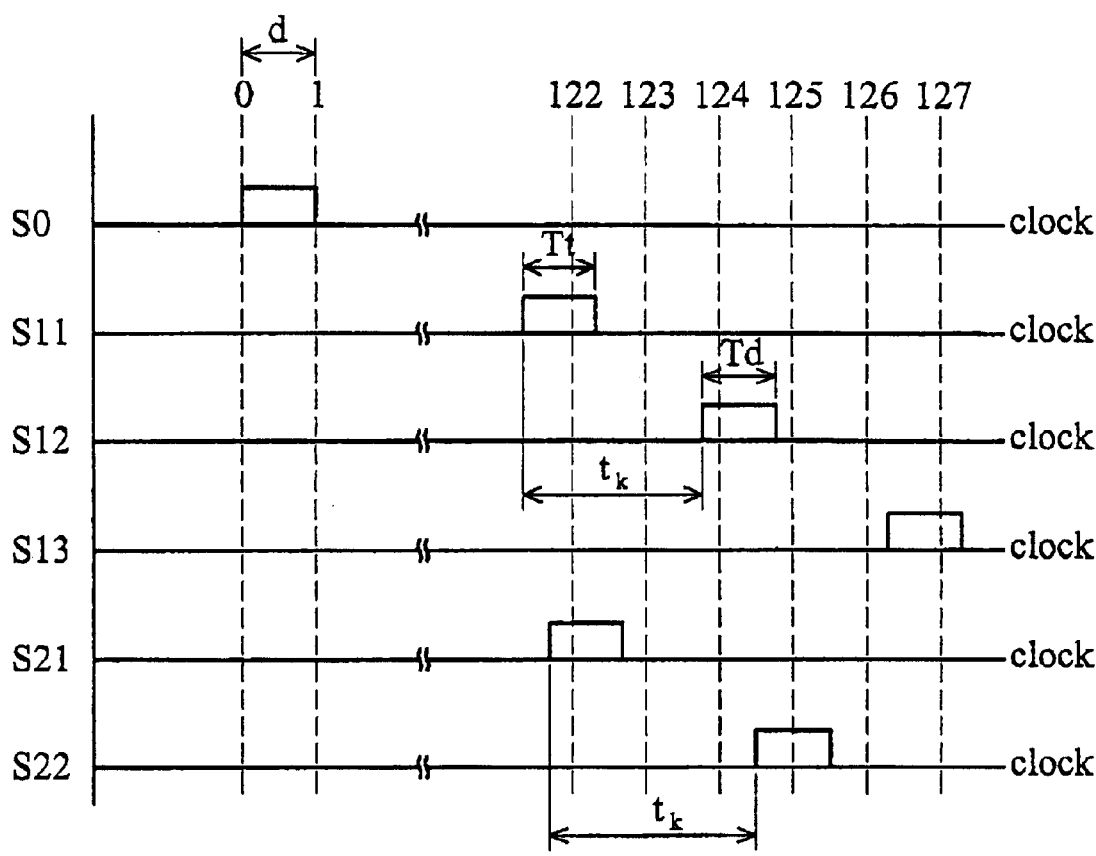
FIG. 5 illustrates a timing diagram of the prefer embodiment.

If a second pulse S21 is reflected with the target in FIG. 5, and a delay pulse S22 is generated by the delay circuit 260, the pulse S11 and the pulse S21 are sampled at the same time, but the pulse S22 is sampled at the $125^{th}$ clock. In this case, Tprecise is 1.487E-6 and another Xprecise is a 244 meter. In the prior art, because the signal S11 and S21 could have been sampled at the $122_{th}$ clock, the time Tprecise and the distance Xprecise have been measured simultaneously. Hence the laser range detector in the preferred embodiment detects a range from a target precisely.

Figure 6:
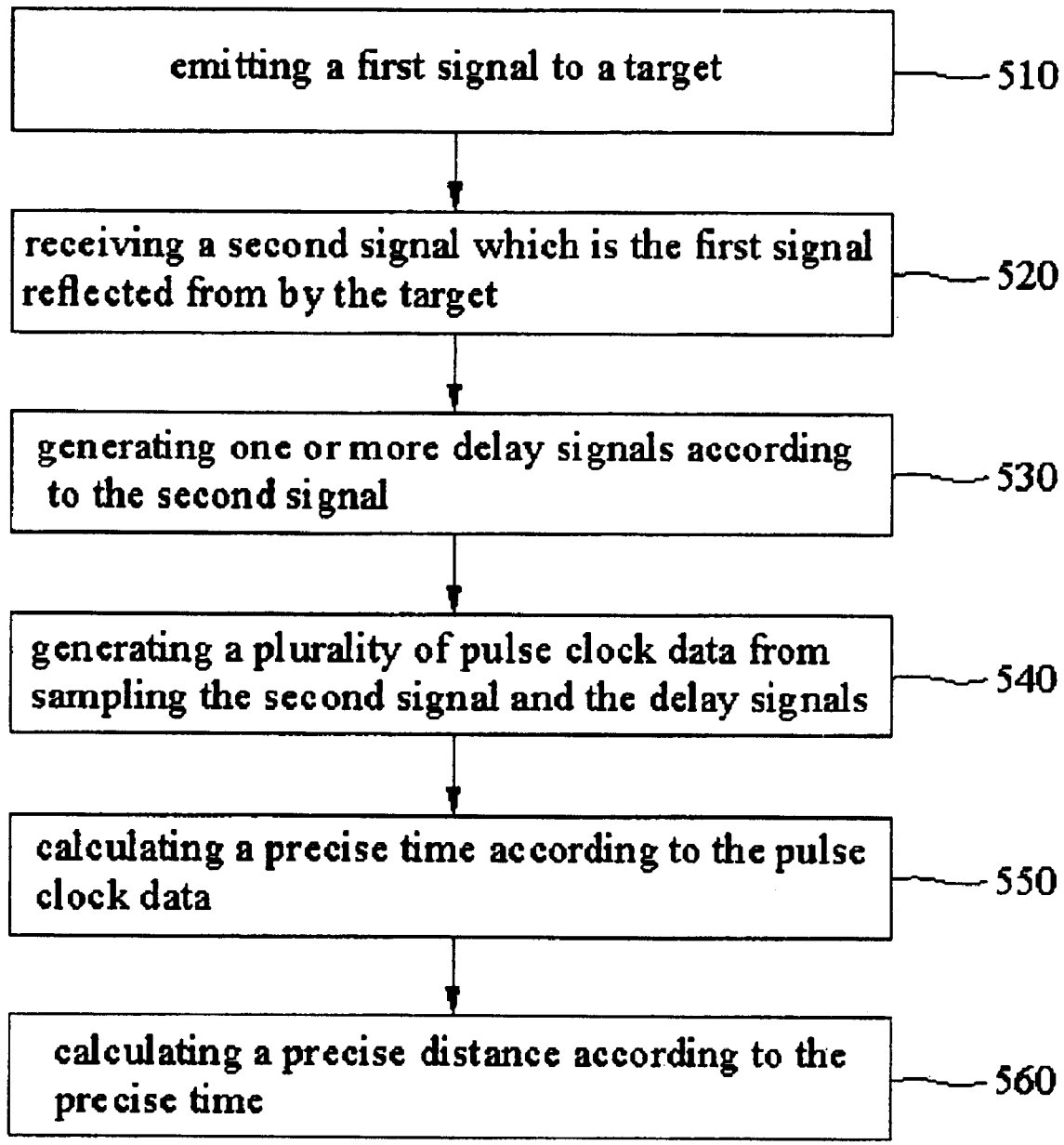
FIG. 6 illustrates a flow diagram of the method for improving the precision of the invention.

As illustrated in FIG. 6, the present invention provides a method of a laser range detector. In step 510, a first signal is emitted to a target. The first signal is emitted from a laser range detector. In step 520, a second signal which is the first signal reflected by the target is received. The laser range detector detects a second signal reflected by the target and the feature of the second signal is similar to the first signal, wherein the feature includes the waveform or the period and so on. In step 530, one or more delay signals are generated. A delay circuit in the laser range detector not only passes the second signal but also generates one or more delay signals. In step 540, a plurality of pulse clock data is generated from sampling the second signal or the delay signals. A sampler in the laser range detector samples the second signal or the delay signals according to a clock signal generated from a clock generator, then outputs a plurality of pulse clock data to a register. The pulse clock data is the clock number of the second signal and the delay signals. And in step 550, a precise time is calculated according to the pulse clock data. A MPU in the laser range detector calculates the precise time from the pulse clock data stored in the register. And in step 560, a precise distance is calculated according to the precise time. The MPU in the laser range detector calculates the precise distance according to the precise time.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A distance measurement method for the laser range detector, comprising the following steps:

setting a default time $t_k$ according to a desired accuracy for the laser range detector;

emitting a pulse to a target based on an actuating signal;

receiving the pulse reflected from the target and transforming the pulse into a target signal;

reproducing the target signal by delaying the target signal for the default time $t_k$ by a delay circuit, so as to obtain one or more delay signals, wherein periods of the target signal and each delay signals are smaller than the default time $t_k$;

sampling the target signal and the delay signals for obtaining a target clock data $T_0$ and a delay clock data according to a pulse clock signal with a constant period d, wherein the constant period d is smaller than the default time $t_k$; obtaining a precise time Tprecise of the pulse according to the equation $$Tprecise = T_o + \frac{\sum_{k=1}^{R-1} t_k - Q \times d}{R},$$

$$Tprecise = T_o + \frac{\sum_{k=1}^{R-1} (t_k - T_o) \times k - Q \times d}{R}, \quad \text{wherein}$$

$$t_x = Q \times d - \frac{k \times d}{R},$$

Q and k are natural numbers, and R is a correction parameter and R=k−1; and obtaining the distance Xprecise to target according to the equation $$Xprecise = \frac{Tprecise \times 3.28E8 \times 10^8}{2}.$$

2. A laser range detector, comprising:
a clock generator for outputting a pulse clock signal;
an emitter for emitting a pulse to a target based on an actual signal;
a receiver for receiving the pulse reflected from the target and transforming the pulse into a target signal;
a delay circuit for delaying the target signal for a default time $t_k$, so as to obtain one or more delay clock signals, wherein a desired accuracy of the laser range detector is set according to default time $t_k$, and periods of the target signal and each delay signal are smaller than the default time $t_k$;
a sampler for sampling the target signal and the delay signals for obtaining target clock data and delay clock data according to the pulse clock signal with a constant period d, wherein the constant period d is smaller than the default time $t_k$;
a register for storing the target clock data $T_0$ and the delay clock data;
a processor for reading the target clock data $T_0$ and the delay clock signal stored in the register, calculating a precise time Tprecise of the pulse according to the equation $$Tprecise = T_o + \frac{\sum_{k=1}^{R-1} t_k - Q \times d}{R},$$

$$Tprecise = T_o + \frac{\sum_{k=1}^{R-1} (t_k - T_o) \times k - Q \times d}{R},$$

and calculating a distance to the target according to the precise time, wherein $$t_k = Q \times d - \frac{k \times d}{R},$$

Q and k are natural numbers, and R is a correction parameter and R=k−1.

3. The laser range detector as claimed in claim 2, wherein the delay circuit comprises:

an input terminal for inputting the target signal;
one or more delay units for delaying the target signal for a default time $t_k$, so as to obtain one or more delay signals; and
a switching circuit for selectively outputting one of the target signal or the delay signals;
wherein a period of the target signal and periods of the each of the delay signals are smaller than the default time $t_k$ and k is a natural number.

4. The laser range detector as claimed in claim 3, wherein the delay circuit further comprises one or more TTL units for altering the waveform of the delay signals, wherein each delay unit corresponds to one TTL unit.

* * * * *